United States Patent
Kasibhotla et al.

(10) Patent No.: US 9,546,567 B2
(45) Date of Patent: Jan. 17, 2017

(54) TURBINE EXHAUST SECTION STRUCTURES WITH INTERNAL FLOW PASSAGES

(71) Applicant: General Electric Company, Schenectady, NY (US)

(72) Inventors: Ravi Shankar Venkata Kasibhotla, Karnataka (IN); Piotr Edward Kobek, Warsaw (PL); Srinivasarao Pakkala, West Godavari (IN); Radu Ioan Danescu, Greer, SC (US); David Martin Johnson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 887 days.

(21) Appl. No.: 13/633,625

(22) Filed: Oct. 2, 2012

(65) Prior Publication Data
US 2013/0084172 A1 Apr. 4, 2013

(30) Foreign Application Priority Data

Oct. 3, 2011 (PL) .......................... 396519

(51) Int. Cl.
*F01D 25/12* (2006.01)
*F01D 25/14* (2006.01)
*F02C 7/12* (2006.01)

(52) U.S. Cl.
CPC .............. *F01D 25/125* (2013.01); *F01D 25/14* (2013.01); *F02C 7/12* (2013.01); *Y02T 50/675* (2013.01)

(58) Field of Classification Search
CPC ........ F01D 9/065; F01D 25/12; F01D 25/125; F01D 25/14; F01D 25/145; F05D 2260/205; F02C 7/12; F02C 7/18; Y02T 50/675

See application file for complete search history.

(56) References Cited

U.S. PATENT DOCUMENTS

| 4,076,452 A | 2/1978 | Hartmann |
| 5,107,676 A | 4/1992 | Hadaway et al. |

(Continued)

FOREIGN PATENT DOCUMENTS

| CN | 101321929 A | 12/2008 |
| CN | 101743391 A | 6/2010 |

(Continued)

OTHER PUBLICATIONS

Unofficial English Translation of Chinese Office Action issued in connection with corresponding CN Application No. 201210368930.3 on Feb. 16, 2015.

(Continued)

*Primary Examiner* — Dwayne J White
*Assistant Examiner* — Adam W Brown
(74) *Attorney, Agent, or Firm* — Fletcher Yoder, P.C.

(57) ABSTRACT

A system is provided including a turbine exhaust section. The turbine exhaust section includes an exhaust flow path. The turbine exhaust section also includes an outer structure having an outer casing, an outer exhaust wall disposed along the exhaust flow path, and an outer cavity disposed between the outer exhaust wall and the outer casing. The turbine exhaust section further includes an inner structure having an inner exhaust wall disposed along the exhaust flow path, an inner cavity disposed between the inner exhaust wall and an inner casing, and a bearing cavity disposed between the inner casing and a bearing housing. In addition, the turbine exhaust section includes a strut extending between the outer (Continued)

structure and the inner structure. The strut includes a first flow passage configured to flow a fluid from the inner cavity to the outer cavity.

20 Claims, 8 Drawing Sheets

(56) References Cited

U.S. PATENT DOCUMENTS

| | | | |
|---|---|---|---|
| 5,388,960 A | 2/1995 | Suzuki et al. | |
| 6,266,954 B1 | 7/2001 | McCallum et al. | |
| 6,438,938 B1 | 8/2002 | Burkholder et al. | |
| 6,578,363 B2 | 6/2003 | Hashimoto et al. | |
| 7,128,530 B2 * | 10/2006 | Anguisola McFeat et al. | 416/2 |
| 7,373,773 B2 | 5/2008 | Noda | |
| 7,766,610 B2 | 8/2010 | Busekros et al. | |
| 8,550,773 B2 | 10/2013 | Almstedt et al. | |
| 8,641,362 B1 * | 2/2014 | Liang | 415/1 |
| 8,740,550 B2 | 6/2014 | Tanioka | |
| 8,979,477 B2 * | 3/2015 | Johnson et al. | 415/111 |
| 2002/0037217 A1 | 3/2002 | Itzel et al. | |
| 2008/0014083 A1 | 1/2008 | Eleftheriou et al. | |
| 2011/0081228 A1 * | 4/2011 | Durocher et al. | 415/115 |
| 2012/0227371 A1 | 9/2012 | Johnson et al. | |

FOREIGN PATENT DOCUMENTS

| | | |
|---|---|---|
| CN | 102678334 A | 9/2012 |
| JP | 2007192028 A | 8/2007 |
| JP | 2011032900 A | 2/2011 |

OTHER PUBLICATIONS

Poland Search Report issued in connection with corresponding PL Application No. P.396519 on Nov. 24, 2011.

* cited by examiner

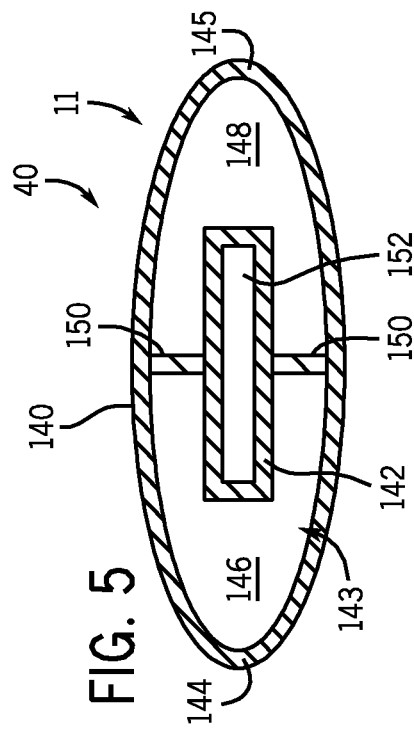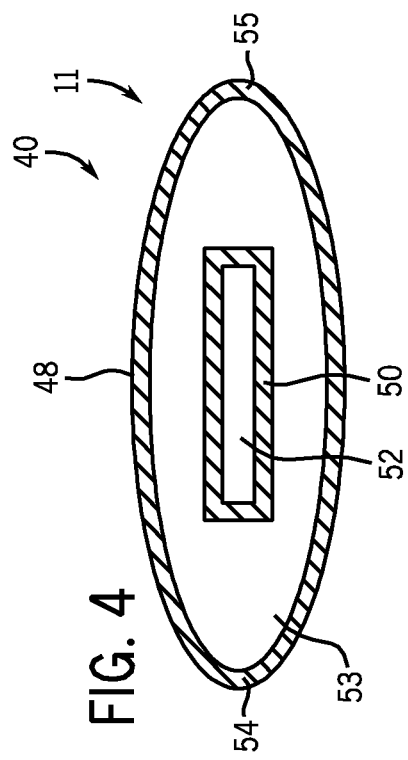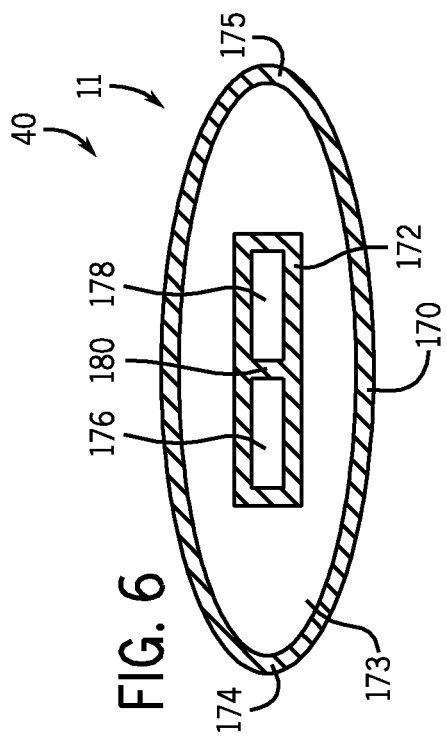

… (1) …

TURBINE EXHAUST SECTION STRUCTURES WITH INTERNAL FLOW PASSAGES

CROSS-REFERENCE TO RELATED APPLICATIONS

This application claims priority to Poland Patent Application No. P.396519, entitled "Turbine Exhaust Section Structures with Internal Flow Passages", filed on Oct. 3, 2011, which is herein incorporated by reference in its entirety.

BACKGROUND OF THE INVENTION

The subject matter disclosed herein relates to gas turbine cooling and, more specifically, to exhaust section cooling.

A gas turbine engine combusts a mixture of fuel and compressed air to generate hot combustion gases, which drive turbine blades to rotate. The rotation of the turbine blades causes rotation of a shaft supported by bearings. The rotation of the shaft generates significant amounts of heat in bearings, and the hot combustion gases exiting through the turbine exhaust section transfers the heat to the turbine exhaust section components. Unfortunately, this heat may cause damage to the turbine components, without adequate cooling in the turbine exhaust section.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine exhaust section. The turbine exhaust section includes an exhaust flow path. The turbine exhaust section also includes an outer structure having an outer casing, an outer exhaust wall disposed along the exhaust flow path, and an outer cavity disposed between the outer exhaust wall and the outer casing. The turbine exhaust section further includes an inner structure having an inner exhaust wall disposed along the exhaust flow path, an inner cavity disposed between the inner exhaust wall and an inner casing, and a bearing cavity disposed between the inner casing and a bearing housing. In addition, the turbine exhaust section includes a strut extending between the outer structure and the inner structure. The strut includes a first flow passage configured to flow a fluid from the inner cavity to the outer cavity.

In a second embodiment, a system includes a turbine exhaust section. The turbine exhaust section includes an exhaust flow path. The turbine exhaust section also includes an outer structure having an outer casing, an outer exhaust wall disposed along the exhaust flow path, and an outer cavity disposed between the outer exhaust wall and the outer casing. The turbine exhaust section further includes an inner structure having an inner exhaust wall disposed along the exhaust flow path, an inner cavity disposed between the inner exhaust wall and an inner casing, and a bearing cavity disposed between the inner casing and a bearing housing. In addition, the turbine exhaust section includes a strut extending between the outer structure and the inner structure. The strut includes a first flow passage configured to flow a fluid from the inner cavity to the outer cavity. The turbine exhaust section also includes a second flow passage disposed at a downstream end of the turbine exhaust system. The second flow passage is configured to flow the fluid into the inner cavity.

In a third embodiment, a system includes a turbine exhaust section. The turbine exhaust section includes an exhaust flow path. The turbine exhaust section also includes an outer structure having an outer casing, an outer exhaust wall disposed along the exhaust flow path, and an outer cavity disposed between the outer exhaust wall and the outer casing. The turbine exhaust section further includes an inner structure having an inner exhaust wall disposed along the exhaust flow path, an inner cavity disposed between the inner exhaust wall and an inner casing, and a bearing cavity disposed between the inner casing and a bearing housing. In addition, the turbine exhaust section includes a strut extending between the outer structure and the inner structure. The strut comprises a first flow passage configured to flow a fluid into the inner cavity, and a second flow passage configured to flow the fluid from the inner cavity to the outer cavity.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a cross sectional view of an embodiment of the strut of FIG. 3 taken along line 4-4;

FIG. 5 is a cross sectional view of an embodiment of the strut of FIG. 3 taken along line 4-4;

FIG. 6 is a cross sectional view of an embodiment of the strut of FIG. 3 taken along line 4-4;

DETAILED DESCRIPTION OF THE INVENTION

Figure 1:
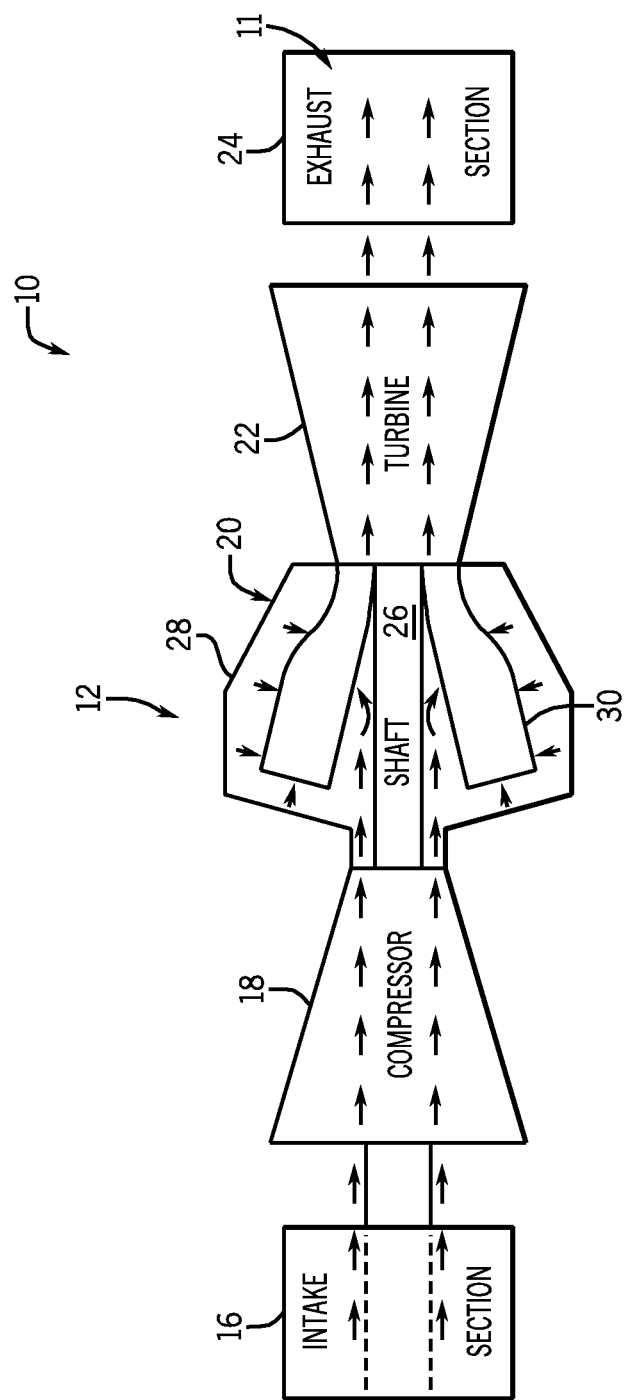
FIG. 1 is a schematic flow diagram of an embodiment of a turbine system having a gas turbine engine that may employ exhaust section cooling.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described in greater detail below, the disclosed embodiments enable cooling and purging of various components (e.g., bearings, struts, outer exhaust, inner structure, and so forth) in an exhaust section of a gas turbine engine. For example, certain embodiments include a strut capable of directing a cooling fluid (e.g., air) from an inner structure of the gas turbine engine to an outer structure of the gas turbine engine. In certain embodiments, the cooling fluid may be received into the inner structure of the gas turbine engine at or near a downstream location (e.g., through a manway) of the gas turbine engine. The cooling fluid being directed through the inner structure to the outer structure cools the bearings and other exhaust section components of the gas turbine engine. Other embodiments may include a strut capable of bi-directional flow that enables the cooling fluid to be blown through a first flow passage of the strut into the inner structure, and back through a second flow passage of the strut from the inner structure to the outer structure. As such, the cooling fluid may transfer heat away from (e.g., cool) the bearings, an inner exhaust wall, an aft portion of the inner structure, and so forth, while adjusting a temperature of the outer structure (e.g., an outer exhaust wall). In certain embodiments, the cooling fluid may vent into an exhaust flow path. Furthermore, in certain embodiments, a variety of inserts may be selectively mounted in openings in the inner structure or outer structure to control an amount of venting. For example, some of the inserts may completely block the flow of cooling fluid, while others reduce the amount of flow of cooling fluid into the exhaust flow path. In addition, in certain embodiments, a plurality of tuning areas may be used to adjust the flow of cooling fluid from the inner structure into the strut and/or between cavities of the inner structure.

FIG. 1 is a schematic flow diagram of an embodiment of a turbine system 10 having a gas turbine engine 12 that may employ exhaust section cooling. For example, the system 10 may include an exhaust section cooling system 11 having one or more cooling flow paths through an exhaust section strut. In certain embodiments, the turbine system 10 may include an aircraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26. As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30, where the compressed air may mix and combust with fuel within the combustors 30 to drive the turbine 22. From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. As described below, the exhaust section 24 may include a plurality of struts, each having one or more cooling flow paths of the exhaust section cooling system 11.

Figure 2:
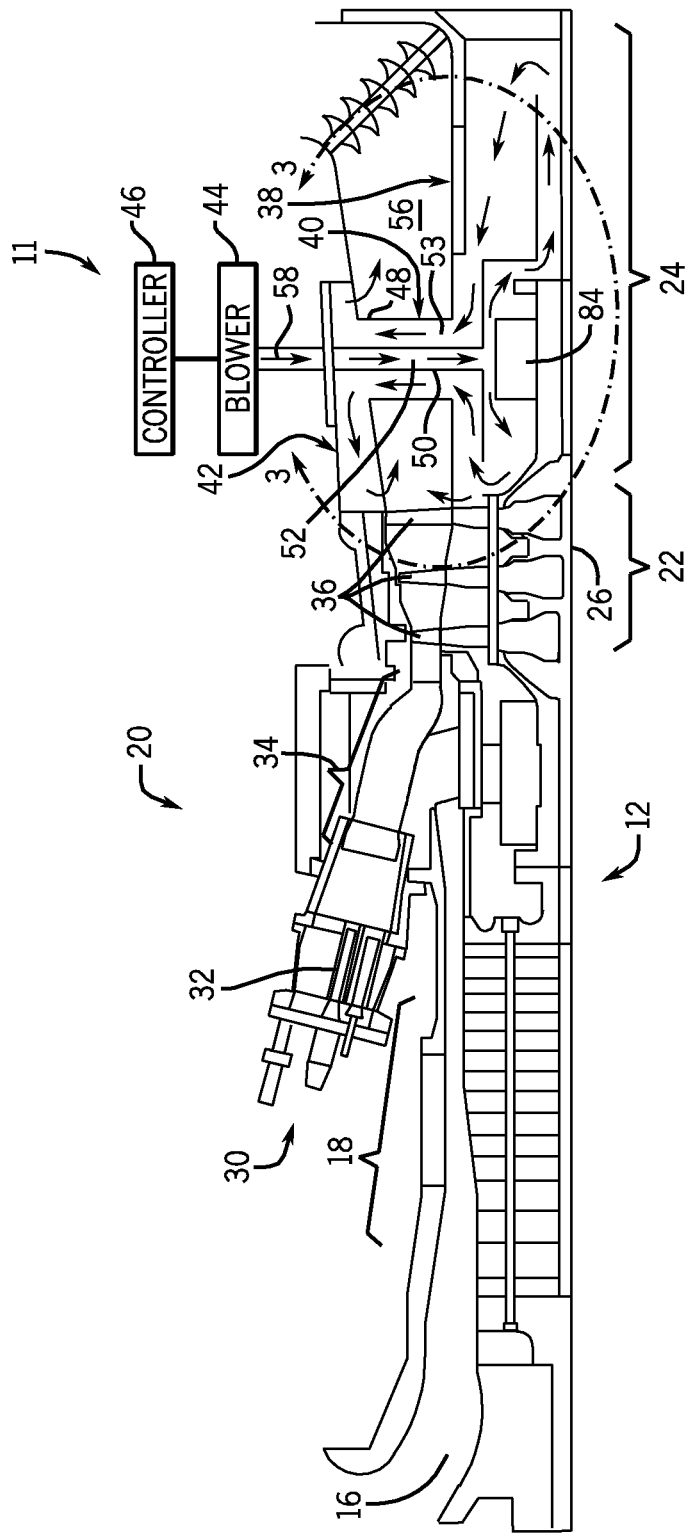
FIG. 2 is a cross sectional side view of an embodiment of the gas turbine engine of FIG. 1 sectioned through the longitudinal axis, illustrating an embodiment of an exhaust cooling system.

FIG. 2 is a cross sectional side view of an embodiment of the gas turbine engine 12 of FIG. 1 sectioned through the longitudinal axis, illustrating an embodiment of the exhaust section cooling system 11. As described above with respect to FIG. 1, air may enter the gas turbine engine 12 through the air intake section 16 and may be compressed by the compressor 18. The compressed air from the compressor 18 may then be directed into the combustor section 20 where the compressed air may be mixed with fuel. The combustor section 20 includes one or more combustors 30. In certain embodiments, the gas turbine engine 12 may include multiple combustors 30 disposed in an annular arrangement. Further, each combustor 30 may include multiple fuel nozzles 32 attached to or near a head end of each combustor 30 in an annular or other arrangement. In operation, the fuel nozzles 32 may inject a fuel-air mixture into the combustors 30 in a suitable ratio for optimal combustion, emissions, fuel consumption, and power output. Within the combustor section 20, the fuel-air mixture may combust to generate hot, pressurized combustion gases. After combustion, the hot pressurized combustion gases may exit the combustor section 20 and flow through a transition piece 34 to the turbine 22. Within the turbine 22, the pressurized combustion gases may turn blades 36 that extend radially within the turbine 22 to rotate the shaft 26 before exiting through the exhaust section 24 as exhaust gas.

The exhaust section 24 may include an inner structure 38, at least one strut 40, and an outer structure 42. The strut 40 provides support between the outer structure 42 and the inner structure 38. As the hot combustion gases exit the turbine 22 and the shaft 26 rotates, the components in the exhaust section 24 may experience high temperature conditions. More specifically, the high temperature conditions may cause thermal stress, wear, and/or damage to the strut 40, the inner structure 38, and the outer structure 42. Accordingly, in the illustrated embodiment, the exhaust section cooling system 11 includes a blower 44 coupled to a controller 46, which controls a cooling air flow through the inner structure 38, the strut 40, and the outer structure 42 to reduce thermal stress and wear of these components and parts disposed therein.

In the embodiment illustrated in FIG. 2, the strut 40 defines an outer body 48 and an inner body 50. The inner body 50 defines a first flow passage 52 (e.g., inner flow passage) and the outer body 48 defines a second flow passage 53 (e.g., outer flow passage) of the exhaust section cooling system 11. As described in greater detail below, in the embodiment illustrated in FIG. 2, the first and second flow passages 52 and 53 are separate from one another to enable bi-directional flow of a cooling fluid (e.g., air) through the strut 40. Although the illustrated strut 40 includes only two separate flow passages 52 and 53, the strut 40 may include any number of separate flow passages to route the cooling fluid (e.g., air) to and from various features in the inner structure 38, the outer structure 42, and the strut 40. As illustrated, the blower 44 (under the control of controller 46) blows cooling air 58 through the outer structure 42, through the strut 40 (i.e., through the first flow passage 52 of the inner body 50), and into the inner structure 38. The source of the cooling air 58 may be the compressor 18 of the gas turbine engine 12 or some other external air source. The cooling air 58 circulates in the inner structure 38, and then exits through the outer body 48 of the strut 40. After flowing through the strut 40 to and from the inner structure 38, the cooling air 58 flows into the outer structure 42 for venting into the exhaust flow path 56. As described in greater detail below, the exhaust section cooling system 11 enables a single blower 44 to cool the strut 40, while simultaneously purging heat from a bearing cavity of the inner structure 38.

Furthermore, in certain embodiments, the inner body 50 of the strut 40 is a load bearing structural support configured to bear a considerable mechanical load between the inner and outer structures 38 and 42 of the exhaust section 24, while the outer body 48 of the strut 40 is not a load bearing structural support. For example, the outer body 48 may be included to protect the inner body 50 by blocking heat from the inner body 50. In particular, the outer body 48 may be designed to flow cooling air externally along the inner body 50 to provide a thermal barrier between the inner body 50 and the hot combustion gases in the exhaust section 24. The outer body 48 also may have greater thermal resistance to the hot combustion gases as compared with the inner body 50. For example, the inner body 50 may have a lower temperature limit than the outer body 48. In some embodiments, the inner body 50 may have a temperature limit lower than the temperature of the hot combustion gases, while the outer body 48 may have a temperature limit substantially above the temperature of the hot combustion gases. Thus, the outer body 48 thermally protects the inner body 50, such that the inner body 50 is able to effectively bear the mechanical load between the inner and outer structures 38 and 42 of the exhaust section 24.

Figure 3:
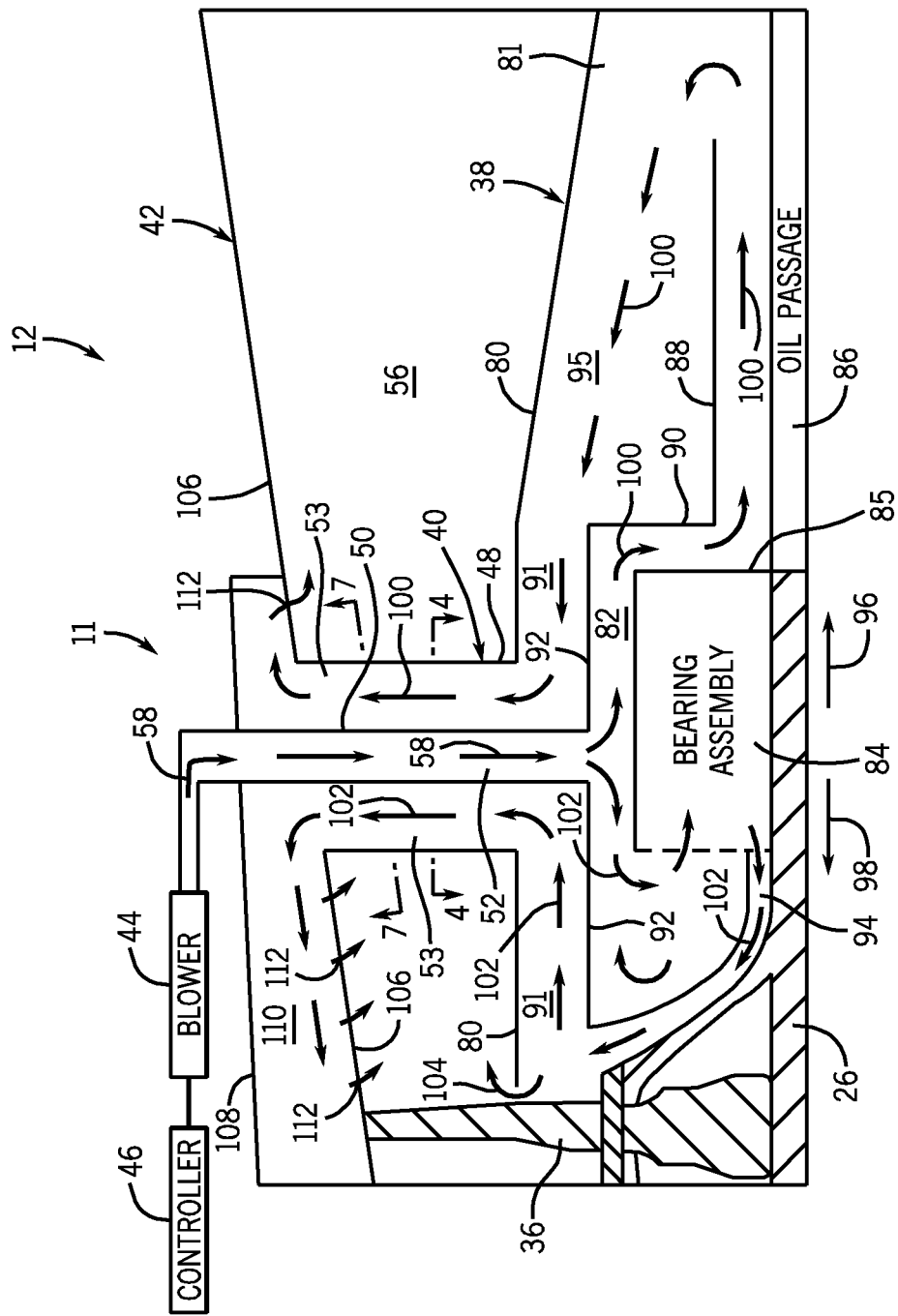
FIG. 3 is a cross sectional side view of an embodiment of the gas turbine engine of FIG. 2 taken within line 3-3, illustrating exhaust section cooling by the exhaust cooling system of FIG. 2.

FIG. 3 is a cross sectional side view of an embodiment of the gas turbine engine 12 of FIG. 2 taken within line 3-3, illustrating exhaust section cooling by the exhaust section cooling system 11 of FIG. 2. The design of the strut 40 enables a single blower 44 to cool the strut 40, the outer structure 42, and the inner structure 38. As illustrated in FIG. 3, the inner structure 38 defines an inner exhaust wall 80, a bearing cavity 82, a bearing assembly 84 housed in a bearing housing 85, a lubricant (e.g., oil) passage 86, a first baffle (e.g., sleeve) 88, a second baffle (e.g., disc) 90, a bearing support wall 92 (e.g., also referred to herein as the inner casing), and an aft shaft rotor cavity 94. As illustrated, the inner structure 38 includes an inner cavity 91 disposed between the inner exhaust wall 80 and the inner casing 92, and the bearing cavity 82 disposed between the inner casing 92 and the bearing housing 85.

As described above, the blower 44 blows cooling air 58 through the inner body 50 of the strut 40. The cooling air 58 convectively cools the first flow passage 52 in the inner body 50, thus reducing the possibility of damage associated with thermal stress in the strut 40. After passing through the strut 40, the cooling air 58 enters the inner structure 38. More specifically, the cooling air 58 passes through the bearing support wall 92 and into the bearing cavity 82, where it cools the bearing assembly 84. The bearing assembly 84 generates significant amounts of heat as its bearings spin during rotation of the shaft 26. Accordingly, the cooling airflow convectively cools the bearing assembly 84 to reduce premature wear or damage caused by the heat.

After contacting the bearing assembly 84, the cooling air 58 separates into two airflows 100 and 102 in opposite axial directions, as indicated by arrows 96 and 98. The airflow 100 traveling in a downstream axial direction 96 contacts the second baffle (e.g., disc) 90, which directs the airflow 100 radially toward the first baffle (e.g., sleeve) 88. The first baffle (e.g., sleeve) 88 routes the airflow 100 axially along the lubricant passage 86. As illustrated, the baffles 88 and 90 focus and restrict (e.g., funnel) the airflow 100 along the lubricant passage 86, thereby enhancing the convective cooling of the lubricant passage 86. Upon exiting the first baffle (e.g., sleeve) 88, the airflow 100 passes along the inner exhaust wall 80 at a downstream end portion 81 of the inner structure 38, thereby cooling the downstream end portion 81 and entering an exhaust cavity 95 of the inner structure 38. Again, the baffles 88 and 90 may force the airflow to pass along the inner casing 92, thereby enhancing convective cooling of the inner casing 92 Upon reaching the strut 40, the airflow 100 then travels through the second flow passage 53 of the outer body 48 and into the outer structure 42.

Unlike the airflow 100, the airflow 102 travels in the opposite (i.e., upstream) axial direction, illustrated by arrow 98. While traveling in the upstream direction of arrow 98, the airflow 102 passes through the bearing assembly 84, and then enters the turbine aft wheel space 94. The airflow 102 then travels toward the inner exhaust wall 80, where part of the airflow 102 exits through a gap 104 into the exhaust path 56. The rest of the airflow 102 returns to the strut 40, where it enters the outer body 48 and travels through the second flow passage 53 to the outer structure 42.

The outer structure 42 includes an outer exhaust wall 106 and an outer casing 108, which define an intermediate outer cavity 110 (e.g., annular space). As the air 100 and 102 exits the strut 40, it enters the outer cavity 110 for controlling the temperature of the outer structure 42 before venting into the exhaust flow path 56. For example, the air 100 and 102 vents into the exhaust flow path 56 through apertures 112 in the outer exhaust wall 106. In some embodiments, the inner exhaust wall 80 may also include apertures 112 for venting the airflow into the exhaust flow path 56. As illustrated, the outer structure 42 includes both a cooled airflow 58 and a warmed airflow 100 and 102, which are separated from one another. These two airflows may be adjusted to control the temperature in the outer structure 42. For example, the ratio of these two airflows may be adjusted by varying the sizes of the first and second flow passages 52 and 53, the number and sizes of the apertures 112 in the inner and outer exhaust walls 80 and 106, and so forth.

FIG. 4 is a cross sectional view of an embodiment of the strut 40 of FIG. 3 taken along line 4-4. As described above, the strut 40 illustrated in FIG. 4 includes the outer body 48 disposed about the inner body 50. As illustrated, the outer body 48 defines the second flow passage 53, a leading edge 54, and a trailing edge 55, while the inner body 50 includes the first flow passage 52. In the present embodiment, the outer body 48 has an oval shape (e.g., an airfoil shape), while the inner body 50 has a rectangular shape. In other embodiments, the inner and outer bodies 50 and 48 may have other shapes, such as rectangular in rectangular, airfoil in airfoil, oval in oval, and so forth. Regardless of the particular shapes, the inner and outer bodies 50 and 48 are disposed one inside another, such that the first and second flow passages 52 and 53 are isolated one inside another (e.g., coaxial). The two flow passages 52 and 53 provide bi-directional airflow between the inner and outer structures 38 and 42. For example, the first flow passage 52 may direct the airflow inwardly from the outer structure 42 to the inner structure 38, while the second flow passage 53 directs the airflow from the inner structure 38 to the outer structure 42, or vice versa. In some embodiments, each flow passage 52 and 53 may be configured to route air to a specific region of the inner structure 38. In either embodiment, the first and second flow passages 52 and 53 in the strut 40 enable a single blower 44 to cool the strut 40, the inner structure 38, and the outer structure 42. In the inner structure 38, the airflow can be directed to various regions to enhance convective cooling before being vented into the exhaust.

FIG. 5 is a cross sectional view of an embodiment of the strut 40 of FIG. 3 taken along line 4-4. The strut 40 illustrated in FIG. 5 includes an outer body 140 disposed about an inner body 142 (e.g., coaxial). The outer body 140 defines a flow passage 143, a leading edge 144, and a trailing edge 145. The outer body 140 may form any number of shapes, such as oval, airfoil, teardrop, rectangular, square, circular, or generally elongated. The outer body 140 is disposed around the inner body 142, which is sized smaller than the outer body 140 to define the flow passage 143. As illustrated, the flow passage 143 is subdivided by walls 150 to form flow passages 146 and 148. In other embodiments, the flow passage 143 may be further subdivided by the walls 150 to define any number of flow passages (e.g., 1, 2, 3, 4, 5, 6, 7, 8, 9, 10, or more flow passages). Similar to the outer body 140, the inner body 142 may form any number of shapes, such as oval, airfoil, teardrop, rectangular, square, circular, or generally elongated. Although the illustrated inner body 142 includes a single flow passage 152, the inner body 142 may include any number of flow passages (e.g., 1, 2, 3, 4, 5, 6, 7, 8, 9, 10, or more flow passages). As described above, the flow passages 146, 148, and 152 enable a single blower 44 to blow cooling air 58 that cools the strut 40, the outer structure 42, and the inner structure 38, while simultaneously purging the bearing cavity 82 of warmed air. Furthermore, the multiple flow passages may enable dedicated coolant flows (e.g., air flows) to and/or from specific regions of the inner structure 38 of the exhaust section 24. For example, dedicated airflows may be routed to/from the bearing assembly 84, the downstream end portion 81 of the inner structure 38, the exhaust cavity 95 of the inner structure 38, the turbine aft wheel space 94, and so forth.

FIG. 6 is a cross sectional view of an embodiment of the strut 40 of FIG. 3 taken along line 4-4. The strut 40 illustrated in FIG. 6 includes an outer body 170 disposed about an inner body 172. The outer body 170 defines a flow passage 173, a leading edge 174, and a trailing edge 175. The outer body 170 may form any number of shapes including oval, airfoil, teardrop, rectangular, square, circular, or generally elongated, and includes the flow passage 173. The outer body 170 is disposed around the inner body 172. As illustrated, the inner body 172 defines two flow passages 176 and 178 separated by a wall 180. In other embodiments, more walls 180 may form additional flow passages in the inner body 172 (e.g., 1, 2, 3, 4, 5, 6, 7, 8, 9, 10, or more flow passages). Similar to the outer body 170, the inner body 172 may form any number of shapes, such as oval, airfoil, teardrop, rectangular, square, circular, or generally elongated. As described above, the flow passages 174, 176, and 178 enable a single blower 44 to blow cooling air 58 that cools the strut 40 and the inner structure 38 while simultaneously purging the bearing cavity 82 of the warmed air. Furthermore, the multiple flow passages may enable dedicated coolant flows (e.g., airflows) to and/or from specific regions of the inner structure 38 of the exhaust section 24. For example, dedicated airflows may be routed to/from the bearing assembly 84, the downstream end portion 81 of the inner structure 38, the exhaust cavity 95 of the inner structure 38, the turbine aft wheel space 94, and so forth.

Figure 7:
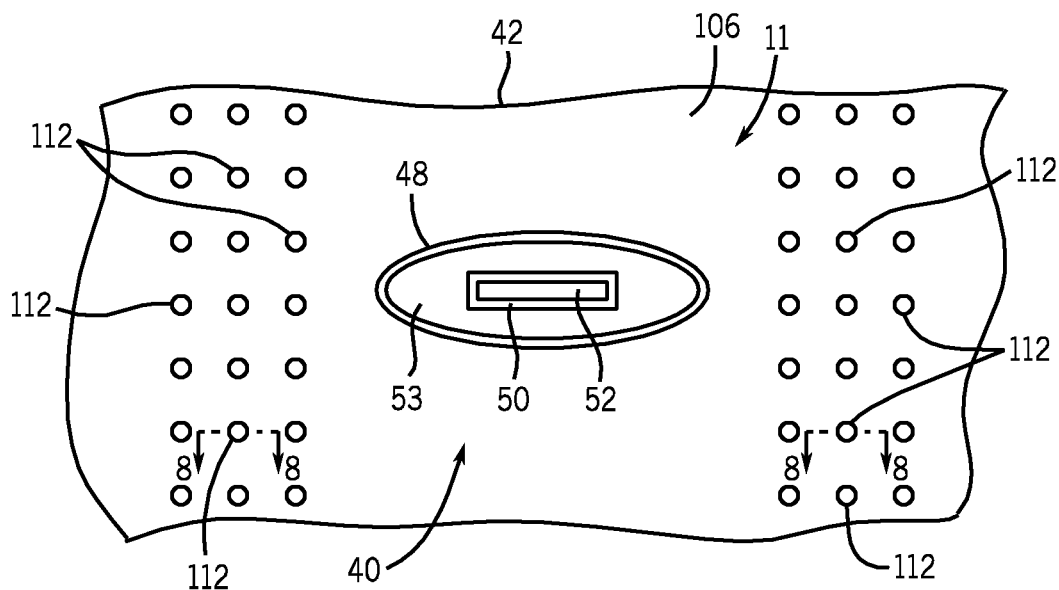
FIG. 7 is a sectional view of the strut and the outer exhaust wall in FIG. 3 taken along line 7-7.

FIG. 7 is a sectional view of the strut 40 and the outer exhaust wall 106 illustrating venting apertures 112 taken along line 7-7 of FIG. 3. As explained above, the cooling air 58 purges the bearing cavity 82, where it flows through the second flow passage 53 in the strut 40 to the outer structure 42 having the outer exhaust wall 106. In the outer structure 42, the airflow passes through the outer cavity 110 and, then vents into the exhaust flow path 56 via the apertures 112 through the outer exhaust wall 106. As illustrated in FIG. 7, the apertures 112 may be circular in shape and arranged in rows. In other embodiments, the apertures 112 may form different shapes (e.g., square, triangular, rectangular, oval, elongated, polygonal, or cross-shaped), and may be arranged into other patterns (e.g., staggered, circular, rectangular, or random). Furthermore, the sizes of the apertures 112 may change depending on their location. For example, the apertures 112 may progressively change (e.g., increase or decrease) in diameter with distance away from the strut 40. In some embodiments, the apertures 112 may be arranged in groups (e.g., 1 to 100 apertures 112) that are spaced apart from one another. Furthermore, the apertures 112 may be arranged between approximately 0 to 180 degrees relative to a rotational axis of the gas turbine engine 12. For example, the apertures 112 may be angled at 15, 30, 45, 60, 75, 90, 105, 120, 135, 150, or 165 degrees relative to the axis.

Figure 8:
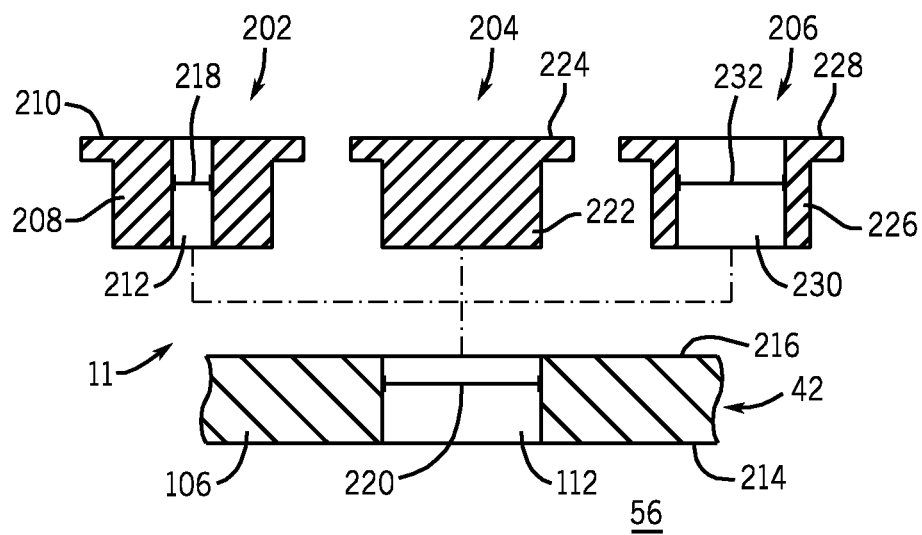
FIG. 8 is a cross sectional view of an embodiment of removable inserts that may be inserted into one or more apertures of the outer exhaust wall in FIG. 7 taken along line 8-8.

FIG. 8 is a cross sectional view of an embodiment of removable inserts 202, 204, and 206 that may be inserted into one or more apertures 112 of FIG. 7 taken along line 8-8. As illustrated in FIG. 8, each aperture 112 may selectively receive a variety of inserts, such as the inserts 202, 204, and 206. The inserts 202, 204, and 206 may assist in controlling the amount of air entering the exhaust flow path 56 of FIG. 3 through the apertures 112 of the outer exhaust wall 106. For example, each insert 202, 204, and 206 may provide a different amount of restriction for the aperture 112. Thus, a variety of different inserts 202, 204, and 206 may be coupled to the apertures 112 to control a flow distribution through the outer exhaust wall 106, thereby controlling a temperature distribution in the outer exhaust wall 106.

As illustrated, the insert 202 includes a body portion 208, a ledge portion 210, and an aperture 212. The body portion 208 fits within the aperture 112, while the ledge portion 210 rests on the inner surface 214 or the outer surface 216 of the outer exhaust wall 106. The body portion 208 may be connected to the outer exhaust wall 106 by an interference fit, threads, a weld, bolts, or another fastener. As illustrated, the aperture 212 defines a diameter 218 that is smaller than a diameter 220 of the aperture 112. Accordingly, upon insertion, the insert 202 will reduce the size of the aperture 112, which then limits the airflow into the exhaust flow path 56. Similar to the insert 202, the insert 204 includes a body portion 222 and a ledge portion 224. The body portion 222 fits within the aperture 220, while the ledge portion 224 contacts the inner surface 214 or outer surface 216 of the outer exhaust wall 106. As illustrated, the insert 204 does not include an aperture and therefore fills the entire aperture 112, thereby blocking cooling air from venting into the exhaust flow path 56. The insert 206 likewise includes a body portion 226, a ledge portion 228, and an aperture 230. The body portion 226 fits within the aperture 112, while the ledge 228 rests on the inner surface 214 or the outer surface 216 of the outer exhaust wall 106. As illustrated, the aperture 230 defines a diameter 232 that is smaller than the diameter 220 of the aperture 112, but larger than the diameter 218 of the insert 202. Accordingly, upon insertion, the insert 206 will reduce the size of the aperture 112, which then limits the airflow into the exhaust flow path 56 by an amount less than insert 202.

Although the illustrated embodiment includes only three inserts 202, 204, and 206, any number of inserts with varying restriction apertures may be employed in the gas turbine engine 12. These inserts 202, 204, and 206 control the amount and distribution of airflow through the outer exhaust wall 106 and into the exhaust flow path 56. For example, the inserts 202, 204, and 206 may be used in different apertures 112 to control the cooling of the outer structure 42 in a more uniform manner. As a result, the selective use of these inserts 202, 204, and 206 may reduce temperature gradients and thermal stress in the outer structure 42.

The embodiments described above with respect to FIGS. 2 through 8 include a strut (e.g., the strut 40 illustrated in FIG. 2) capable of bi-directional airflow that enables a single cooling air blower 44 to cool the bearing assembly 84, and other exhaust section components of the gas turbine engine 12. In particular, in the embodiment illustrated in FIGS. 2 and 3, the bi-directional strut 40 includes the first flow passage 52 within the inner body 50, and the second flow passage 53 between the outer body 48 and the inner body 50. As described above, the cooling air 58 may be blown through the first flow passage 52 into the inner structure 38, and then back through the second flow passage 53 into the outer structure 42, and then vented into the exhaust flow path 56.

Figure 9:
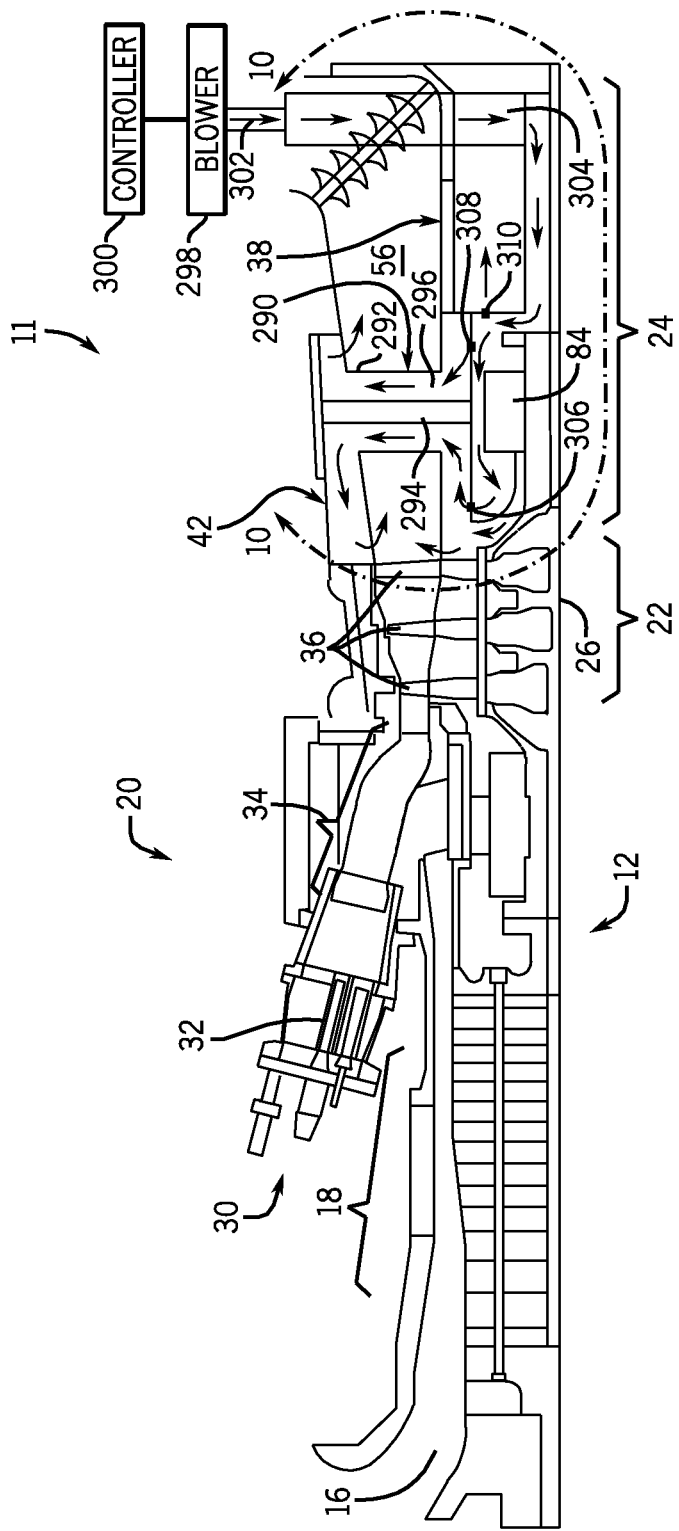
FIG. 9 is a cross sectional side view of an embodiment of the gas turbine engine of FIG. 1 sectioned through the longitudinal axis, illustrating an embodiment of the exhaust section cooling system.

However, in other embodiments, the strut may include only one flow passage, or only one flow direction (e.g., with one or more flow passages), while still being capable of routing cooling air from the inner structure 38 through the strut. For example, FIG. 9 is a cross sectional side view of an embodiment of the gas turbine engine 12 of FIG. 1 sectioned through the longitudinal axis, illustrating an embodiment of the exhaust section cooling system 11. In the embodiment illustrated in FIG. 9, the exhaust section 24 includes at least one strut 290 that provides support between the outer structure 42 and the inner structure 38. Similar to the strut 40 illustrated in FIGS. 2 and 3, the strut 290 illustrated in FIG. 9 defines an outer body 292 and an inner body 294. However, as opposed to hollow inner body 50 of the strut 40 illustrated in FIGS. 2 and 3, the inner body 294 of the strut 290 illustrated in FIG. 9 is a solid body, having no inner flow passage defined therethrough. As such, the area between the outer body 292 and the solid inner body 294 defines the only flow passage 296 through the strut 290 for the exhaust section cooling system 11 illustrated in FIG. 9.

As illustrated in FIG. 9, a blower 298 (e.g., similar to the blower 44 illustrated in FIGS. 2 and 3) may be controlled by a controller 300 (e.g., similar to the controller 46 in FIGS. 2 and 3) to blow cooling air 302 (e.g., similar to the cooling air 58 in FIGS. 2 and 3) first through the inner structure 38 and then through the outer structure 42. For example, as illustrated in FIG. 9, in certain embodiments, the blower 298 may be configured to blow the cooling air 302 through an interior volume of a manway 304 of the exhaust section 24 (e.g., in the aft diffuser region). The source of the cooling air 302 may be the compressor 18 of the gas turbine engine 12 or some other external air source. Regardless of the exact location of introduction of the cooling air 302 into the inner structure 38, the cooling air 302 is introduced at or near a downstream location of the exhaust section 24. In other words, some of the cooling air 302 is introduced into the inner structure 38 downstream of the strut 290 and the bearing assembly 84, among other components of the exhaust section 24. Portions of the cooling air 302 blown into the inner structure 38 circulates through the inner structure 38 (e.g., across the bearing assembly 84), and then exits through the flow passage 296 of the strut 290 and into the outer structure 42 for venting into the exhaust path 56. As with the embodiments illustrated in FIGS. 2 and 3, the exhaust cooling system 11 illustrated in FIG. 9 enables a single blower 298 to cool the strut 290, while simultaneously purging the bearing cavity 82 and removing heat from the inner structure (e.g., from the bearing assembly 84).

The solid inner body 294 of the strut 290 illustrated in FIG. 9 may provide slightly more load bearing structural support than the hollow inner body 50 of the strut 40 illustrated in FIGS. 2 and 3, while the outer body 292 of the strut 290 is not a load bearing structural support. In certain embodiments, the inner body 294 may have a temperature limit lower than the temperature of the hot combustion gases, while the outer body 292 may have a temperature limit substantially above the temperature of the hot combustion gases. Thus, the outer body 292 thermally protects the inner body 294, such that the inner body 294 is able to effectively bear the mechanical load between the inner and outer structures 38 and 42 of the exhaust section 24. In addition, as described in greater detail below, in certain embodiments, the exhaust section cooling system 11 may include tunable areas 306, 308, 310 for controlling the flow of cooling air through the bearing region (e.g., the bearing cavity 82), the inner cavity 91, the flow passage 296 of the strut 290, and so forth.

Figure 10:
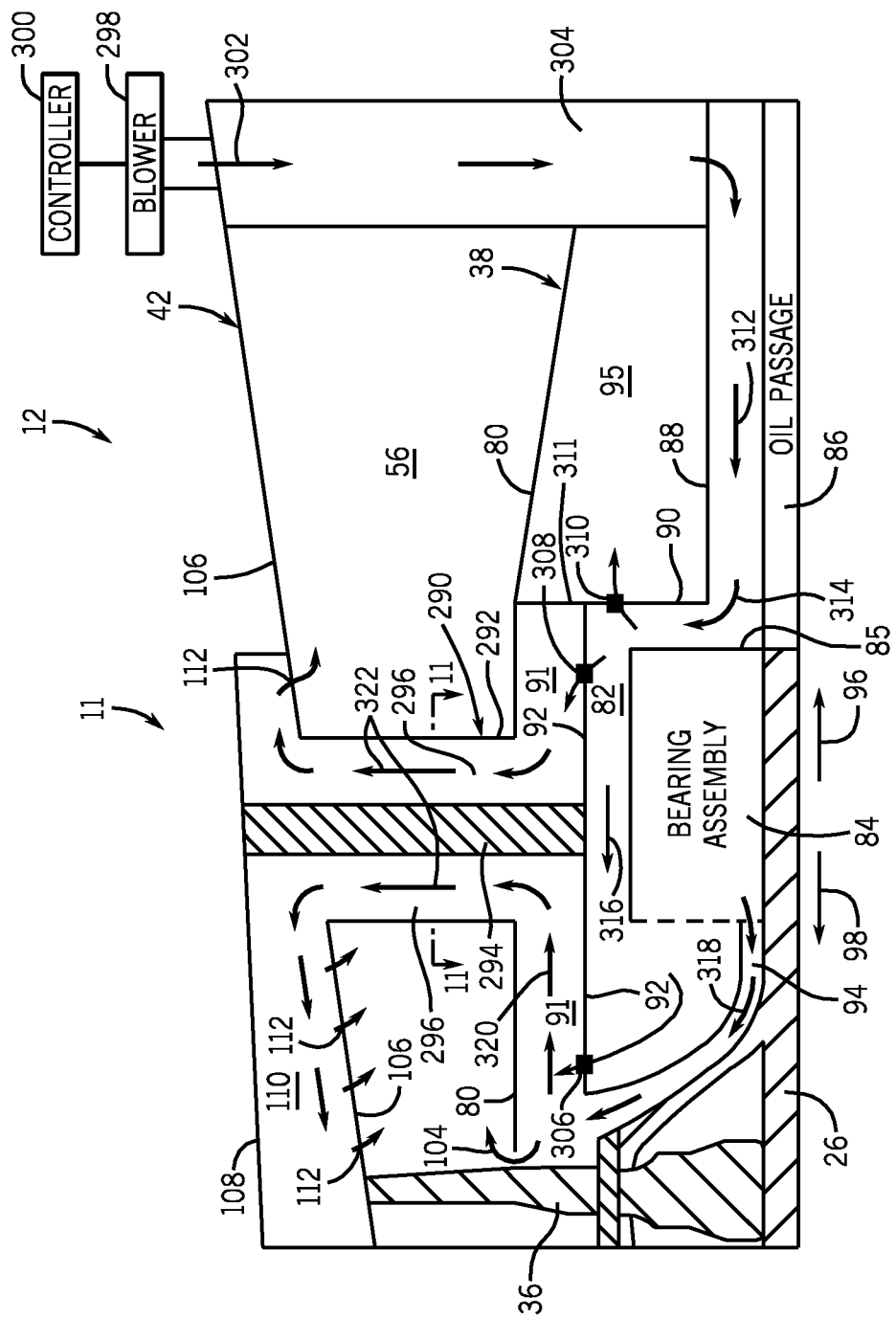
FIG. 10 is a cross sectional side view of an embodiment of the gas turbine engine of FIG. 9 taken within line 10-10, illustrating exhaust section cooling by the exhaust section cooling system of FIG. 9.

FIG. 10 is a cross sectional side view of an embodiment of the gas turbine engine 12 of FIG. 9 taken within line 10-10, illustrating exhaust section cooling by the exhaust section cooling system 11 of FIG. 9. As described above, the blower 298 blows cooling air 302 through the manway 304, or another component connected to the inner structure 38 downstream of the strut 290 and bearing assembly 84. As illustrated by arrow 312, some of the cooling air 302 then flows in the upstream axial direction 98 between the first baffle (e.g., sleeve) 88 and the lubricant passage 86, which is connected to the bearing assembly 84 for the purpose of delivering lubricating oil to the bearing assembly 84. Then, as illustrated by arrows 314 and 316, some of the cooling air flows into and through the bearing cavity 82, where it cools the bearing assembly 84. As described above, the bearing assembly 84 generates significant amounts of heat as its bearings spin during rotation of shaft 26. Accordingly, the cooling airflow convectively cools the bearing assembly 84 to reduce premature wear or damage caused by the heat.

After contacting the bearing assembly 84, some of the cooling air enters the turbine aft wheel space 94, as illustrated by arrow 318. This cooling air then travels toward the inner exhaust wall 80, where part of the cooling air exits through the gap 104 into the exhaust path 56. The cooling air that does not exit through the gap 104 flows back toward the flow passage 296 of the strut 290 in the axial downstream direction 96, as illustrated by arrow 320. Upon reaching the strut 290, some of the cooling air then travels through the flow passage 296 between the outer body 292 and the solid inner body 294 and into the outer structure 42, as illustrated by arrows 322. As described above, as the cooling air exits the strut 290, it enters the outer cavity 110 for controlling the temperature of the outer structure 42 before venting into the exhaust flow path 56. For example, some of the cooling air vents into the exhaust flow path 56 through the apertures 112 in the outer exhaust wall 106. In some embodiments, the inner exhaust wall 80 may also include apertures 112 for venting the airflow into the exhaust flow path 56.

As described above, the exhaust section cooling system 11 illustrated in FIG. 10 also includes three tunable areas 306, 308, 310 for controlling the flow of cooling air within the inner structure 38 and through the flow passage 296 of the strut 290. More specifically, the tunable areas 306, 308, 310 are used to control distribution (e.g., percentage split) of cooling air flow to different regions of the inner structure 38. Although illustrated as including three tunable areas 306, 308, 310, in other embodiments, any number of tunable areas, such as 1, 2, 3, 4, 5, 6, 7, 8, 9, 10, or more, may be used to slit the flow of cooling air into any percentage of cooling air desirable. Moreover, the percentage split between each tunable area may vary, and may be independently and actively controlled by, for example, a controller (e.g., the controller 300) manipulating the tunable areas. In addition, the tunable areas 306, 308, 310 may also passively control the flow of cooling air inasmuch as the tunable areas 306, 308, 310 may include differently sized and shaped orifices that may be selected during design of the exhaust section cooling system 11.

As illustrated, the first and second tunable areas 306 and 308 may be used to tune how much of the cooling air is allowed to flow from the bearing cavity 82 through the inner cavity 91 and into the flow passage 296 of the strut 290. More specifically, the first tunable area 306 may be configured to enable a certain amount of cooling air from within the bearing cavity 82 to flow through the inner cavity 91 and into the flow passage 296 through the bearing support wall 92 at a location upstream of the strut 290. Similarly, the second tunable area 308 may be configured to enable a certain amount of cooling air from within the bearing cavity 82 to flow through the inner cavity 91 and into the flow passage 296 through the bearing support wall 92 at a location downstream of the strut 290. Furthermore, the third tunable area 310 may be configured to enable a certain amount of cooling air to escape from within the bearing cavity 82 in the downstream axial direction 96 through the second baffle (e.g., disc) 90 and into the exhaust cavity 95. In certain embodiments, the amount of cooling air allowed to vent into the exhaust cavity 95 may be actively controlled. In other words, a controller (e.g., the controller 300) may actively control the third tunable area 310 to adjust the amount of cooling air that flows from the bearing cavity 82 into the exhaust cavity 95 during operation of the gas turbine engine 12. In certain embodiments, the cooling air vented into the exhaust cavity 95 may be directed out of the exhaust cavity 95 at a downstream location, such as through an outlet flow passage within the manway 304 (e.g., separate from the inlet flow passage through which the cooling air 302 is received). In addition, although illustrated as being blocked or separated from the strut 290, in certain embodiments, cooling air in the exhaust cavity 95 may be enabled to flow into the strut 290 inasmuch as the wall 311 illustrated between the exhaust cavity 95 and the strut 290 may either be removed or have openings (or, indeed, separate tunable areas) therethough.

All of the tunable areas 306, 308, and 310 may be tuned using inserts similar to the inserts (e.g., inserts 202, 204, and 206) described above with respect to FIG. 8. In other words, in certain embodiments, the tunable areas 306, 308, and 310 may include apertures similar to the apertures 112 described above with respect to FIGS. 7 and 8. As described above, by controlling the distribution of the cooling air through the tunable areas 306, 308, and 310, the temperature distribution within and throughout the inner structure 38 and through the flow passage 296 of the strut 290 may be controlled. More specifically, for example, splitting the flow of the cooling air using the first and second tunable areas 306 and 308 facilitates tuning the amount of cooling air distributed upstream and downstream of the strut 290. As such, more or less cooling air may be directed toward the leading edge or the trailing edge of the strut 290 as needed. As described above, in certain embodiments, the distribution of cooling air through the first and second tunable areas 306 and 308 may be actively controlled. In other words, a controller (e.g., the controller 300) may actively control the first and second tunable areas 306 and 308 to adjust the distribution of the cooling air that flows from the bearing cavity 82 through the inner cavity 91 and into the flow passage 296 during operation of the gas turbine engine 12.

Figure 11:
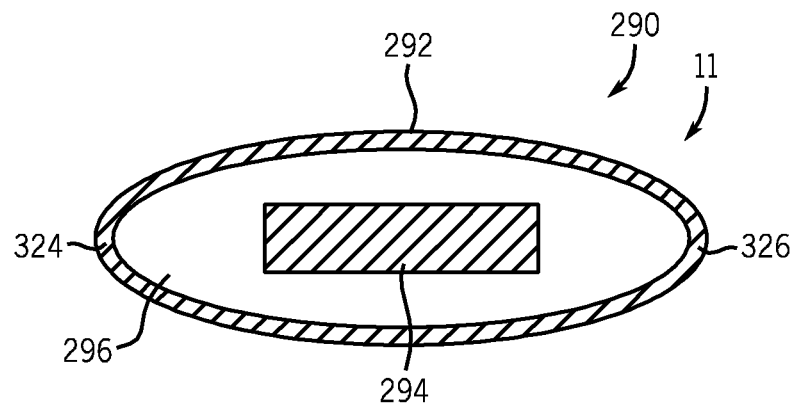
FIG. 11 is a cross sectional view of an embodiment of the strut of FIG. 10 taken along line 11-11.

FIG. 11 is a cross sectional view of an embodiment of the strut 290 of FIG. 10 taken along line 11-11. As described above, the strut 290 illustrated in FIG. 11 includes the outer body 292 disposed about the solid inner body 294. As illustrated, the flow passage 296 is defined by the area between the outer body 292 and the solid inner body 294. In addition, the outer body 292 defines a leading edge 324, and a trailing edge 326. In the present embodiment, the outer body 292 has an oval shape (e.g., an airfoil shape), while the inner body 294 has a rectangular shape. In other embodiments, the inner and outer bodies 294 and 292 may have other shapes, such as rectangular in rectangular, airfoil in airfoil, oval in oval, and so forth. Indeed, both the inner and outer bodies 294 and 292 may form any number of shapes, such as oval, airfoil, teardrop, rectangular, square, circular, or generally elongated. Regardless of the particular shapes, the inner and outer bodies 294 and 292 are disposed one inside another, such that the flow passage 296 is the volume between the inner and outer bodies 294 and 292.

Figure 12:
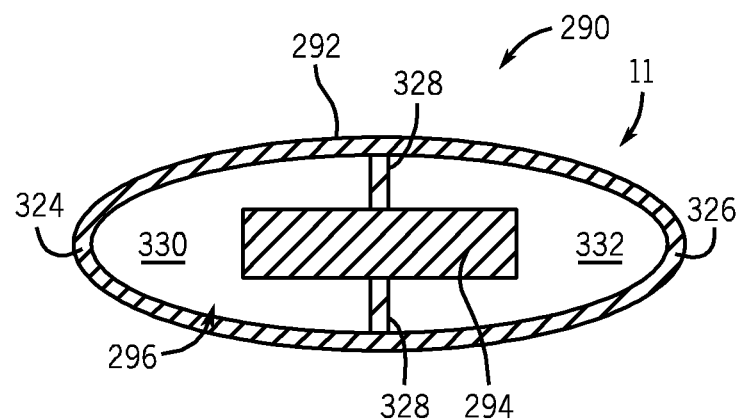
FIG. 12 is a cross-sectional view of an embodiment of the strut of FIG. 10 taken along line 11-11.

FIG. 12 is a cross-sectional view of an embodiment of the strut 290 of FIG. 10 taken along line 11-11. As illustrated in FIG. 12, the flow passage 296 is subdivided by walls 328 to form flow passages 330 and 332. In other embodiments, the flow passage 296 may be further subdivided by the walls 328 to define any number of flow passages (e.g., 1, 2, 3, 4, 5, 6, 7, 8, 9, 10, or more flow passages). In the embodiment illustrated in FIG. 12, the first flow passage 330 may at least partially include the cooling air that flows through the first tunable area 306, whereas the second flow passage 332 may at least partially include the cooling air that flows through the second tunable area 308. As such, because these flows may be actively and/or passively controlled as described above, more cooling may be provided at hot spots of the strut 290 (e.g., higher cooling air flow rates along the leading edge of the strut 290).

As described above, the controllers 46, 300 illustrated in FIGS. 2, 3, 9, and 10 may be configured to actively control the operation of the blowers 44 and 298, the tunable areas 306, 308, and 310, and other components of the exhaust section cooling system 11. The controllers 46, 300 may each include a processor, which may read from and write to a memory, such as a non-transitory, computer-readable medium (e.g., a hard drive, flash drive, random access memory (RAM), compact disc (CD), and so forth), having computer instructions encoded thereon, which are configured to perform the active control operations described herein. More specifically, the controllers 46, 300 may be configured to receive signals relating to operating parameters of the exhaust section cooling system 11 (e.g., signals relating to temperatures in and around the struts 40, 290, the flow passages 52, 53, 296, the bearing assembly 84, the bearing cavity 82, the inner cavity 91, the exhaust cavity 95, and so forth) and to generate and transmit control signals for the blowers 44 and 298, the tunable areas 306, 308, and 310, and other components of the exhaust section cooling system 11.

Technical effects of the invention include the ability to cool multiple components of a turbine exhaust section with a single blower. In particular, the disclosed embodiments enable cooling of struts, bearings, and other portions of an inner structure of the turbine exhaust section with the single blower. For example, the struts may be configured with one or more passages to direct airflow both into and out of the inner structure to simultaneously cool the struts, the bearings, and so forth. In one embodiment, each strut includes at least two passages to direct airflows in opposite directions into and out of the inner structure. In another embodiment, one strut may include at least one passage to direct air out of the inner structure. In this embodiment, the air may be received at or near a downstream location from the strut.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine exhaust section, comprising:
   an exhaust flow path;
   an outer structure comprising an outer casing, an outer exhaust wall disposed along the exhaust flow path, and an outer cavity disposed between the outer exhaust wall and the outer casing;
   an inner structure comprising an inner exhaust wall disposed along the exhaust flow path, an inner cavity disposed between the inner exhaust wall and an inner casing, and a bearing cavity disposed between the inner casing and a bearing housing;
   a strut extending between the outer structure and the inner structure, wherein the strut at least partially defines a first flow passage configured to flow a fluid from the inner cavity to the outer cavity;
   a second flow passage disposed at a downstream end portion of the turbine exhaust section downstream of the strut, wherein the second flow passage is configured to flow the fluid into the bearing cavity; and
   one or more tunable areas through the inner casing, wherein the one or more tunable areas are configured to control a flow of the fluid from the bearing cavity to the inner cavity.

2. The system of claim 1, wherein the strut comprises an inner body and an outer body, wherein the first flow passage is disposed between the inner body and the outer body.

3. The system of claim 2, wherein the inner body comprises a load bearing structural support, and the outer body is not load bearing.

4. The system of claim 2, wherein the inner body comprises a solid body.

5. The system of claim 1, wherein the second flow passage is disposed within a manway of the turbine exhaust section.

6. The system of claim 1, wherein the inner cavity comprises at least one opening through the inner casing, wherein the at least one opening is configured to flow the fluid from the bearing cavity into the first flow passage.

7. The system of claim 6, wherein the at least one opening comprises an opening through the inner casing at an upstream location relative to the first flow passage.

8. The system of claim 6, wherein the at least one opening comprises an opening through the inner casing at a downstream location relative to the first flow passage.

9. The system of claim 1, wherein the outer exhaust wall comprises a plurality of openings configured to flow the fluid from the outer cavity into the exhaust flow path, and each opening of the plurality of openings comprises a removable insert.

10. A system, comprising:
    a turbine exhaust section, comprising:
    an exhaust flow path;
    an outer structure comprising an outer casing, an outer exhaust wall disposed along the exhaust flow path, and an outer cavity disposed between the outer exhaust wall and the outer casing;
    an inner structure comprising an inner exhaust wall disposed along the exhaust flow path, an inner cavity disposed between the inner exhaust wall and an inner casing, and a bearing cavity disposed between the inner casing and a bearing housing;
    a strut extending between the outer structure and the inner structure, wherein the strut at least partially defines a first flow passage configured to flow a fluid from the inner cavity to the outer cavity;
    a second flow passage disposed at a downstream end portion of the turbine exhaust section downstream of the strut, wherein the second flow passage is configured to flow the fluid into the bearing cavity; and
    one or more tunable areas configured to control a flow of the fluid from the bearing cavity to an aft exhaust cavity through a wall that at least partially defines the bearing cavity.

11. The system of claim 10, wherein the bearing cavity comprises at least one opening in a baffle wall, wherein the at least one opening is configured to flow the fluid from the bearing cavity into an exhaust cavity.

12. The system of claim 10, wherein the second flow passage is disposed within a manway of the turbine exhaust section.

13. The system of claim 10, wherein the strut comprises an inner body and an outer body, wherein the first flow passage is disposed between the inner body and the outer body.

14. The system of claim 13, wherein the inner body comprises a solid body.

15. The system of claim 13, wherein the inner body comprises a load bearing structural support, and the outer body is not load bearing.

16. The system of claim 10, comprising one or more tunable areas through the inner casing, wherein the one or more tunable areas are configured to control a flow of the fluid from the bearing cavity to the inner cavity.

17. A system, comprising:
    a turbine exhaust section, comprising:
    an exhaust flow path;
    an outer structure comprising an outer casing, an outer exhaust wall disposed along the exhaust flow path, and an outer cavity disposed between the outer exhaust wall and the outer casing;

an inner structure comprising an inner exhaust wall disposed along the exhaust flow path, an inner cavity disposed between the inner exhaust wall and an inner casing, and a bearing cavity disposed between the inner casing and a bearing housing;

a strut extending between the outer structure and the inner structure, wherein the strut at least partially defines a first flow passage configured to flow a fluid from the inner cavity to the outer cavity;

a second flow passage disposed at a downstream end portion of the turbine exhaust section downstream of the strut, wherein the second flow passage is configured to flow the fluid into the bearing cavity; and an aft exhaust cavity disposed between the inner exhaust wall and the second flow passage, wherein the aft exhaust cavity is configured to receive vented fluid from the bearing cavity through a wall that at least partially defines the bearing cavity.

18. The system of claim 17, wherein the strut comprises an inner body and an outer body, wherein the first flow passage is disposed within the inner body, and the second flow passage is disposed between the inner body and the outer body.

19. The system of claim 18, wherein the inner body comprises a load bearing structural support, and the outer body is not load bearing.

20. The system of claim 17, comprising one or more tunable areas through the inner casing, wherein the one or more tunable areas are configured to control a flow of the fluid from the bearing cavity to the inner cavity.

* * * * *